United States Patent
Zicker

Patent Number: 5,794,141
Date of Patent: Aug. 11, 1998

[54] MULTI-MODE COMMUNICATION NETWORK WITH HANDSET-ASSISTED CORDLESS BASE STATION ACTIVATION

[76] Inventor: Robert G. Zicker, 2930 Ascot La., Roswell, Ga. 30076

[21] Appl. No.: 659,731

[22] Filed: Jun. 6, 1996

Related U.S. Application Data

[63] Continuation-in-part of Ser. No. 315,010, Sep. 29, 1994, which is a continuation-in-part of Ser. No. 201,455, Feb. 24, 1994, Pat. No. 5,594,782.

[51] Int. Cl.[6] .................................................. H04M 11/00
[52] U.S. Cl. ........................................ 455/418; 455/419
[58] Field of Search .................................. 455/418, 419, 455/420, 422, 462, 465, 552, 553, 456, 426

[56] References Cited

U.S. PATENT DOCUMENTS

| | | | |
|---|---|---|---|
| 4,989,230 | 1/1991 | Gillig et al. | 379/59 |
| 5,068,889 | 11/1991 | Yamashita | 455/462 |
| 5,179,373 | 1/1993 | John | 455/419 |
| 5,260,988 | 11/1993 | Schellinger et al. | 379/59 |
| 5,297,191 | 3/1994 | Gerszberg | 455/419 |
| 5,367,558 | 11/1994 | Gillig et al. | 455/552 |
| 5,442,680 | 8/1995 | Schellinger et al. | 455/552 |
| 5,485,505 | 1/1996 | Norman et al. | 455/419 |
| 5,504,803 | 4/1996 | Yamada et al. | 455/552 |
| 5,553,314 | 9/1996 | Grube et al. | 455/419 |

*Primary Examiner*—Dwayne D. Bost
*Assistant Examiner*—Myron K. Wyche
*Attorney, Agent, or Firm*—Leonard C. Suchyta

[57] ABSTRACT

A multi-mode communication network (12) uses a two phase process to activate a cordless base station (22) using the assistance of a multi-mode handset (18). A customer activation system (30.32) collects cellular and cordless activation data (56.58). The handset (18) is activated for cellular use (92). In a first phase of activation, cordless base station programming data are transferred from the customer activation system (30.32) to the handset (18). During a second phase of activation (124.150), the cordless base station programming data are transferred from the handset (18) to the cordless base station (22).

18 Claims, 7 Drawing Sheets

FIG. 2

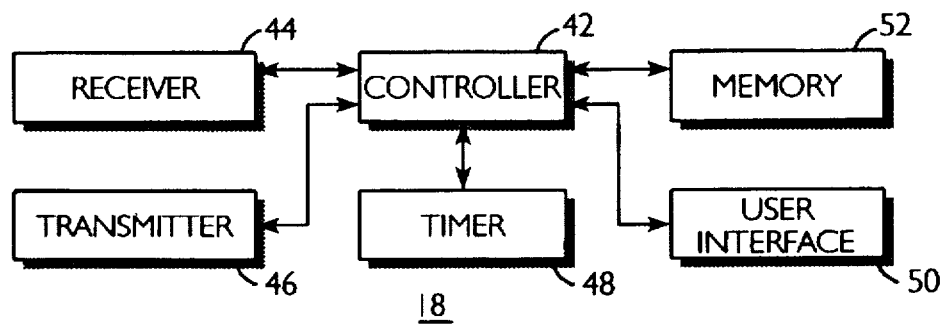
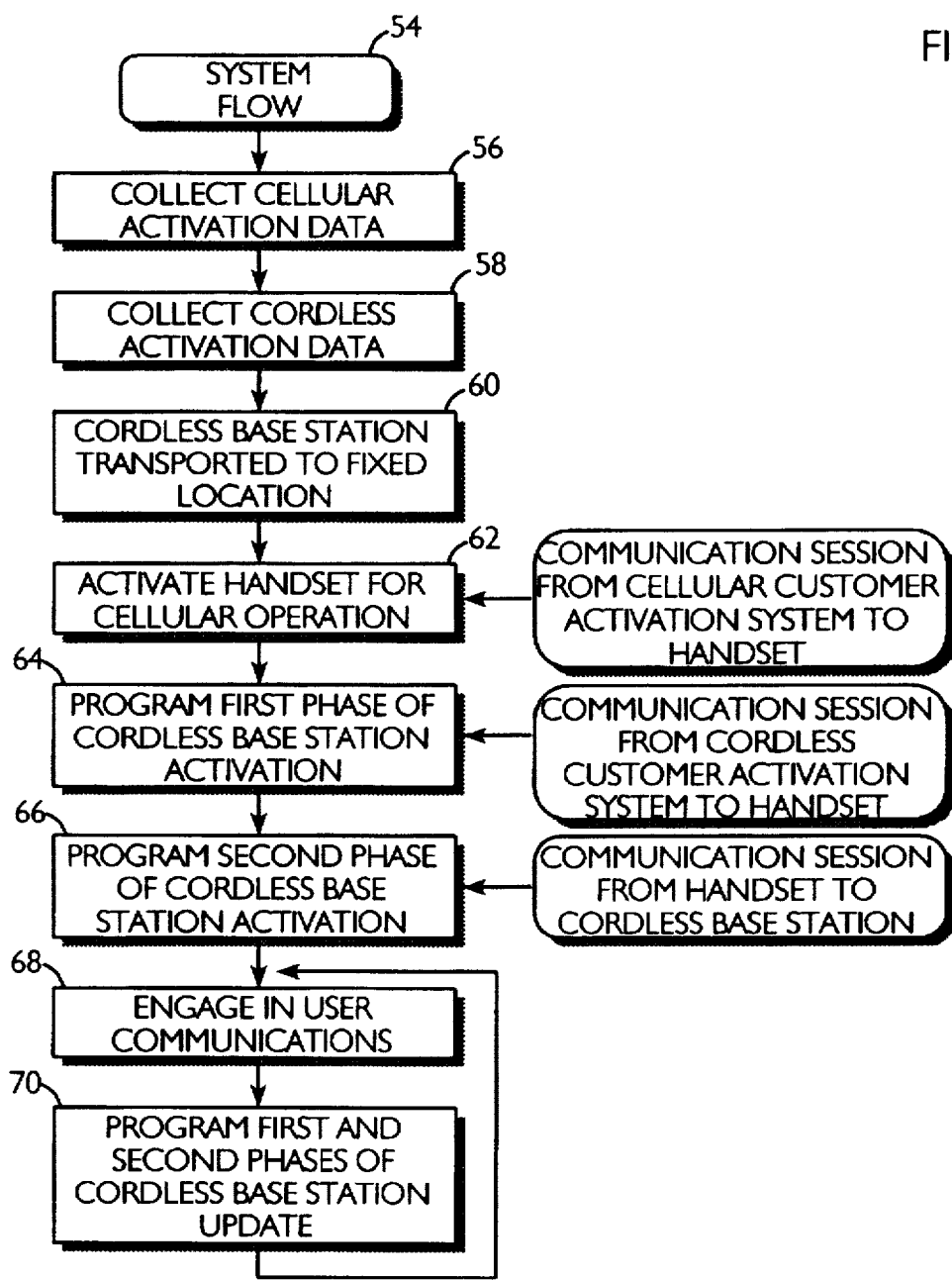
FIG. 3
FIG. 4

MULTI-MODE COMMUNICATION NETWORK WITH HANDSET-ASSISTED CORDLESS BASE STATION ACTIVATION

RELATED PATENTS

This application is a continuation-in-part of Ser. No. 08/315,010, filed Sep. 29, 1994, entitled "Cellular Radiotelephone System With Remotely Programmed Mobile Stations," by Robert G. Zicker, et al., which is a continuation-in-part of Ser. No. 08/201,455, filed Feb. 24, 1994, now U.S. Pat. No. 5,594,782 entitled "Multiple Mode Personal Wireless Communication System," by Robert G. Zicker, et al. both of which are incorporated herein by reference.

TECHNICAL FIELD OF THE INVENTION

The present invention relates generally to radiotelephones which operate as both cellular phones and cordless phones and which are used to activate cordless base stations.

BACKGROUND OF THE INVENTION

Mobile stations, including portable handsets and other cellular-compatible devices, used in connection with cellular telecommunication networks are often manufactured in a blank or unprogrammed state. An activation process is performed both to acquire customer identification information so that customers may be successfully billed for communication services and to personalize the mobile stations so that they will be capable of providing communication services. Until a mobile station has been activated, it can neither make nor receive a call. After activation, changes in either customer preferences or system operating characteristics can require changes to the mobile stations' personalization.

Personalization is accomplished by causing the mobile station to include certain user-specific programming. The user-specific programming represents data which cause the mobile station to function as desired for a specific user. Examples of user-specific programming for a conventional mobile station include, but are not limited to, a mobile identification number (MIN) and home system identification (SID).

One problem which has continually plagued the cellular industry is that of realizing activation. Early activation techniques involved the use of specifically configured programming equipment and/or skilled service representatives to whom users took their mobile stations for activation. Current activation techniques involve stocking preprogrammed mobile stations whose programming is likely, but not guaranteed, to be appropriate for the specific users who purchase them from mass marketing outlets. In the near future, various forms of over the air service provisioning (OTASP) will remotely program mobile stations to accomplish activation. The above-listed related patents discuss one version of OTASP.

Multi-mode communication networks add another layer of complication to the already vexing problem of activation. Multi-mode communication networks use common components for multiple functions. For example, a multi-mode communication system may use a common portable radiotelephone handset to communicate both in a cordless mode of operation and in a cellular mode of operation. In the cordless mode of operation, the handset may communicate at low power with a cordless base station typically located within a few hundred feet of the handset. The cordless base station may couple to one or more local loops of a public switched telecommunication network (PSTN). Thus, the handset may communicate through the cordless base station with telephonic devices that couple to the PSTN. In the cellular mode of operation, the handset may communicate at moderate power with a cellular land station typically located within a few miles of the handset. The cellular land station typically couples to the PSTN through a mobile telephone switching office (MTSO). Thus, the handset may communicate through the cellular land station with telephonic devices that couple to the PSTN.

From a user's perspective, cordless operation is more desirable than cellular operation because cordless communication services are typically provided at lower cost than cellular communication services, and low power operation allows handset batteries to last longer. From a communication service provider's perspective, the low power characteristic of cordless operation allows a given spectrum bandwidth to carry many more communications in a given area than cellular operation.

In a typical situation, a cordless base station may be located near a user's residence or work place. Cordless mode operations are available through the handset when the user is near the user's residence or work place, and cellular mode operations are available in other locations. Various handoff, automatic registration and call forwarding schemes may be employed so that the handset automatically switches between cordless and cellular modes as needed to track movement of the handset.

The activation of cordless base stations poses a problem not experienced in the activation of mobile stations. Mobile stations are configured to receive on forward channels and transmit on reverse channels. Conversely, cordless base stations are configured to receive on reverse channels and transmit on forward channels. Thus, mobile stations communicate with cellular land stations and cordless base stations, but cordless base stations and cellular land stations cannot communicate with one another. Of course, one could design the RF transceiver of a cordless base station to additionally communicate with cellular land stations and become activated programming via OTASP. However, this approach is highly undesirable because it would require the inclusion of additional hardware which would drive up cordless base station costs.

In connection with one prior art cordless base station, activation is achieved through dial up modem connections established through the wired local loop to which a cordless base station attaches. This approach is also undesirable. This type of activation requires users to follow extensive instructions and consumes the user's phone line for activation. Reliance upon users to successfully follow instructions poses increasing activation problems as the instructions become more complex, and consuming a user's phone line makes the phone line unavailable to the user for incoming or outgoing calls.

Moreover, this type of activation initiates the activation process from the cordless base station and not a customer activation system. This is an undesirable direction for the establishment of a connection through which activation will take place. The customer activation system cannot control activation timing with this direction of connection establishment and can easily become overloaded. If the cordless base station does not initiate the call, then conflicts may arise with other computer devices attached to the user's phone line. Moreover, if problems occur during the activation process, the user's phone line is not available for calling a customer support representative.

The above-listed related patents describe an OTASP approach for activation of cordless base stations. In the described approach, a connection to the cordless base station from a customer activation system is initiated by the customer activation system. This connection is established through special equipment which is either mounted on a cell site tower with cellular land station antennas or mounted in a vehicle. The special equipment is configured to be in data communication with a customer activation system. This equipment receives on forward channels and transmits on reverse channels. While this approach has many benefits, the use of the special equipment is undesirable. The special equipment increases costs, and complexity, and reduces system reliability.

SUMMARY OF THE INVENTION

Accordingly, it is an advantage of the present invention that an improved multi-mode communication network with handset-assisted cordless base station activation is provided.

Another advantage is that the present invention may realize cordless base station activation through over the air activation.

Another advantage is that the present invention may refrain from consuming a user's phone line for cordless base station activation.

Another advantage is that the present invention requires no additional equipment or hardware beyond that which is required to conduct user communications.

Another advantage is that the present invention may initiate a connection for the purpose of cordless base station activation from a customer activation system.

The above and other advantages of the present invention are carried out in one form in a multi-mode communication network in which cellular and cordless communications are delivered through a multi-mode handset by a method for programming a cordless base station. The method calls for first transferring cordless base station programming data from a customer activation system to the handset. The cordless base station programming data are then transferred from the handset to the cordless base station.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a frequency management chart which illustrates an exemplary common pool of channels used for cordless and cellular operations;

FIG. 3 shows a block diagram of hardware included in a preferred multi-mode handset;

FIG. 4 shows a flow diagram of a system flow process performed to activate multi-mode handsets and cordless base stations;

DETAILED DESCRIPTION OF THE PREFERRED EMBODIMENTS

Figure 1:
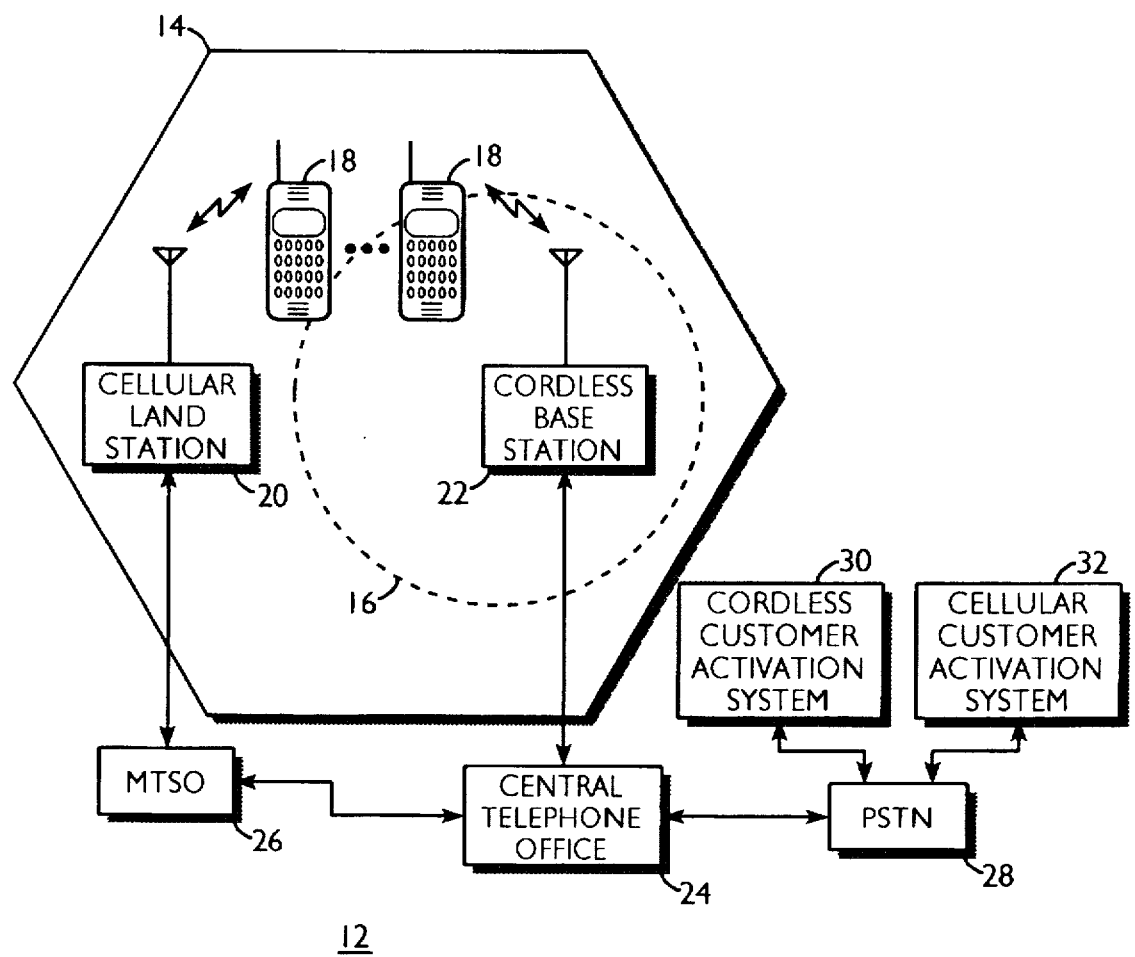
FIG. 1 shows a schematic view of various components included in a multi-mode communication network.

FIG. 1 shows a schematic block diagram view of an environment in which a multi-mode communication network 12 may be implemented. Network 12 supports a cellular communication system defined by a grid of cells 14 and any number of cordless communication systems defined by coverage areas 16. FIG. 1 shows only one of cells 14 schematically shaped as a hexagon and only one of cordless coverage areas 16 schematically shaped as a circle. Many more cells 14 and/or cordless coverage areas 16 may be included. Desirably, each cordless coverage area 16 is substantially smaller than cell 14. Although not shown, other cellular systems may be overlaid on the same area depicted in FIG. 1. In the preferred embodiment, the cellular system is compatible with conventional AMPS standards, and the cordless systems also utilize AMPS standard frequency channels and communication protocols. However, nothing prevents the principles of the present invention from being applied to other types of cellular systems.

As illustrated in FIG. 1, network 12 includes any number of portable multi-mode radiotelephone handsets 18, of which only two are shown, a cellular land station 20 for each cell 14, and a cordless base station 22 for each cordless coverage area 16. Cellular land station 20 and cordless base station 22 each represent base stations. The terms cellular land station and cordless base station are used herein only to distinguish the two from one another and to remain consistent with historical usage. Cellular base stations are not required to be located on the land, and cordless base stations desirably refrain from operating at frequencies and using communication protocols which have historically been used for cordless telephony.

Handset 18 may, when located within both cell 14 and cordless coverage area 16, communicate with either cellular land station 20 or cordless base station 22. When outside cordless coverage area 16 but still within cell 14, handset 18 can communicate only with cellular land station 20. Cell 14 depicts the best server cell for handset 18; however, multiple best server cell sites may be possible for handset 18. Additional best server cell sites, if identified, reside near cordless coverage area 16. Identifying a best server cell is discussed in more detail in relation to FIG. 5.

Cordless base station 22 couples to a central telephone office 24 through one or more wired local loops. Cellular land station 20 couples to central telephone office 24 through a mobile telephone switching office (MTSO) 26 and appropriate trunks. Through central telephone office 24, user communications may be provided between handset 18 and other telephonic devices coupled to the public switched telecommunication network (PSTN) 28 via either cordless mode communications or cellular mode communications.

A cordless customer activation system 30 and a cellular customer activation system 32 both couple to PSTN 28. These customer activation systems consist of customer service representatives using general purposes computers or other devices connected to PSTN 28. The representatives may initiate RF communication sessions between the customer activation systems, cellular land stations 20, and handsets 18 while the customer is in telephonic contact with the representative. As discussed in more detail below, a handset 18 may thereafter communicate with cordless base station 22. While FIG. 1 shows separate activation systems 30 and 32, nothing prevents a single, integrated activation system from being used to accomplish both cellular and cordless activations.

Figure 2:
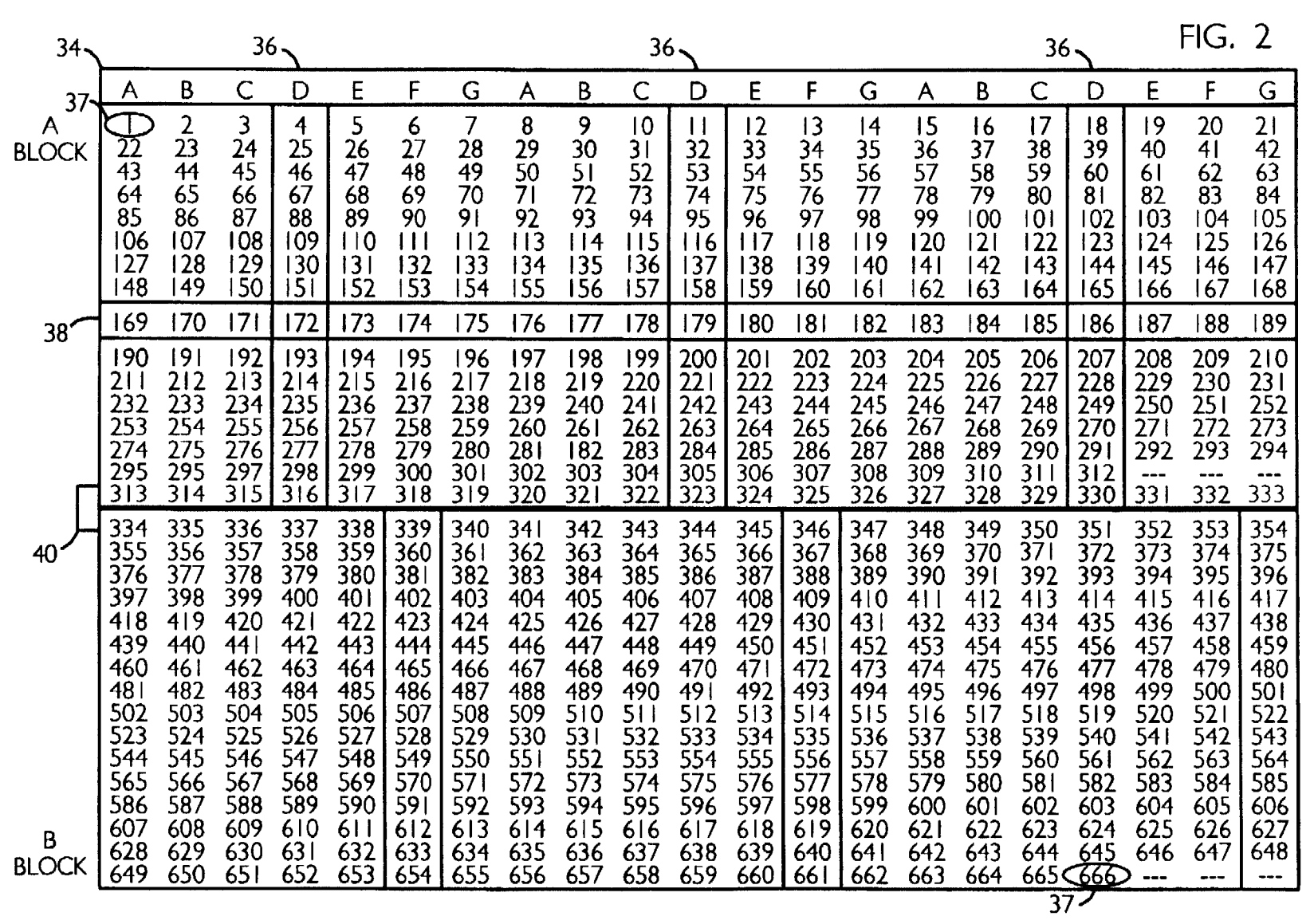

FIG. 2 shows a frequency management chart which illustrates an exemplary common pool of channels 34 used for both cordless and cellular mode communications. Channel numbers (listed as 1–666 in the FIG. 2 example) identify discrete channels. Each channel desirably represents a full duplex or bidirectional channel which has a forward portion and a reverse portion. The forward portion defines a link directed toward handset 18 while the reverse portion defines a link directed away from handset 18. Thus, when handset 18 tunes a receiver to a channel, it tunes the receiver to the forward portion of the channel, and when cellular land station 20 or cordless base station 22 tunes a receiver to a channel, they tune the receiver to the reverse portion of the channel. Each of handset 18, cellular land station 20, and cordless base station 22 may be set up to communicate on any channel identified in pool of channels 34.

However, as illustrated by FIGS. 1 and 2, handset 18, cellular land station 20, and cordless base station 22 need to restrict and otherwise manage their use of channels to minimize interference. Pool of channels 34 is divided into diverse cellular subsets 36, indicated as vertical columns in FIG. 2. Each cellular subset 36 is desirably configured so that its channels are non-contiguous. In other words, no two adjacent channels are included in any single cellular subset 36. Cellular subsets 36 are assigned to different cells 14, and cellular communications may use only channels included in the cellular subset 36 assigned to the cell 14 where communications are taking place. The precise frequencies and the number of channels included in pool of channels 34 are not relevant parameters for the purposes of the present invention.

Pool of channels 34 also includes two predetermined dedicated control channels 37, shown inside ovals in FIG. 2 and associated with channel numbers 1 and 666. One of dedicated control channels 37 is found in the A block of channels and the other of dedicated control channels 37 is found in the B block of channels. Dedicated control channels 37 are discussed below in more detail in connection with FIGS. 7 and 8.

Also included in pool of channels 34 is a cordless subset 38 of channels. Cordless subset 38 desirably includes approximately twenty contiguous channels, represented as a single horizontal row in FIG. 2. The number of channels included in cordless subset 38 is somewhat arbitrary. In accordance with the preferred embodiment, all cordless systems select the channels upon which they will operate from cordless subset 38, regardless of where the cordless systems are geographically located and regardless of which cellular subsets 36 may be assigned for use in the same location. The use of contiguous channels insures that wherever a cordless system is located, cordless subset 38 will include channels which are not being used by the overlaid cellular system because cellular subsets 36 tend to use non-contiguous channels.

While FIG. 2 illustrates an exemplary selection of channels 169–189 in the A block of pool of channels 34 as cordless subset 38, this is largely an arbitrary selection. Desirably, cordless subset 38 avoids cellular control channels 40 (channels 313–354). And, the selection of cordless subset 38 channels is desirably independent of dedicated channels 37. Otherwise, any A and/or B block grouping of channels consistent with the system assignment (A or B) is acceptable for purposes of the present invention, and cordless subset 38 may vary from cellular system to cellular system. The specific numbering used in FIG. 2 for channels in cellular subset 36, cordless subset 38, and dedicated control channels 37 is for example only and may vary from system to system.

FIG. 3 shows a block diagram of hardware included in a preferred multi-mode handset 18. For clarity, standard operating elements well known to those skilled in the art and unimportant to the present invention are not shown in FIG. 3 or described in detail herein. In general, handset 18 is configured around a controller 42, which controls the operation of handset 18. Various components are connected to or are in data communication with controller 42, including a receiver 44, a transmitter 46, a timer 48, a user interface 50, and a memory 52. Controller 42 may, for example, be a conventional microprocessor circuit well known in the cellular telephony art.

Receiver 44, which is connected to controller 42, is configured to receive signaling data and user communications over a channel selected from pool of channels 34 (see FIG. 2). For cellular mode operation, the channel will be selected from a cellular subset 36 assigned to the cell 14 where handset 18 currently resides. For cordless mode operation, the channel will be selected from cordless subset 38 or dedicated channels 37.

Handset 18 also includes transmitter 46, which is connected to controller 42. Transmitter 46 is configured to transmit signaling data associated with conventional cellular telephone operations, processes, and user communications. If desired, transmitter 46 and receiver 44 may be integrated into one transceiver assembly. Desirably, only a single transmitter and receiver are included for supporting both cellular and cordless mode operations in order to reduce costs, power consumption, and weight.

Timer 48 couples to controller 42 and helps handset 18 track the passage of time. User interface 50 couples to controller 42 and desirably includes keypad push buttons that are utilized to control standard cellular and cordless telephone functions, a speaker, a microphone, a display, and other user interface devices well known in the art. Memory 52 couples to controller 42 and stores programming instructions that define the various processes described below. In addition, memory 52 may store various cellular and cordless operating parameters and various tables and lists of data used in the operation of handset 18 and the activation of cordless base station 22.

For the purposes of the present invention, cordless base station 22 has a block diagram (not shown) similar to that shown in FIG. 3. However, receiver 44 and transmitter 46 of handset 18 operate on forward and reverse portions, respectively, of selected channels, while a corresponding receiver and transmitter of cordless base station 22 operate on reverse and forward portions, respectively, of selected channels. Likewise, cordless base station 22 may, but need not, have a simplified user interface compared to user interface 50 of handset 18. Moreover, handset 18 is desirably battery configured for portable operation while cordless base station 22 is desirably energized by a public power distribution network and is otherwise configured for stationary operation.

FIG. 4 shows a chart depicting a system flow process 54. Process 54 provides a general overview of the processes included in the preferred embodiments of the present invention. FIGS. 5–8 provide more details on these processes. Referring to FIG. 4, tasks 56, 58, and 60 occur with the cooperation of a user of communication services before a handset 18 can be used in either a cellular or cordless mode. In task 56, cellular activation data is collected from a user by a customer service representative of the cellular customer activation system 32 (see FIG. 1). These data include such items as the user's name, the user's address, a feature package selected by the user, and possibly the electronic serial number of the handset 18 which the user is attempting to activate. Cellular activation will assign a mobile identification number (MIN) to the handset. In task 58 cordless activation data, including the user's address are collected from the user by a customer service representative of the cordless activation system 30 (see FIG. 1). In addition, the cellular MIN may be included with cordless activation data.

Although FIG. 4 shows tasks 56 and 58 as being sequential, nothing prevents task 58 from being performed prior to task 56 or combined with task 56. Likewise, the collection of cordless activation data need not be dependent on the collection of cellular activation data.

In task 60, the cordless base station 22 is moved to its fixed location. This task most likely consists of the user taking cordless base station 22 to his or her home or work place. Task 60 may occur before task 56 and 58 since the current preferred embodiment envisions a handset 18 packaged together with a cordless base station 22 so the package is purchased and taken home intact.

After activation data has been collected, various communication sessions involving handset 18 are performed to accomplish the activation of multi-mode handset 18 and cordless base station 22. Process 54 performs a task 62 in which handset 18 is activated for cellular operation. FIG. 4 shows that this activation occurs during a communication session between handset 18 and cellular customer activation system 32 (see FIG. 1). In the preferred embodiment, cellular customer activation system 32 initiates this communication session, and handset 18 is paged using the handset's ESN. Accordingly, a form of over the air service provisioning (OTASP) is implemented. However, this is not a requirement of the present invention.

Following cellular activation or in connection with cellular activation, in a task 64 a communication session between handset 18 and cordless customer activation system 30 (see FIG. 1) programs a first phase of cordless base station activation. This communication session is initiated by cordless customer activation system 30. In the preferred embodiment of the present invention, the first of two phases of cordless base station activation consists of an RF communication programming session between cordless customer activation system 30 and handset 18. When this first phase of programming is done, a task 66 accomplishes the second phase of cordless base station activation. The second phase of cordless base station activation consists of programming cordless base station 22 through an RF communication session established between handset 18 and cordless base station 22 (see FIG. 1). This two phase activation of the cordless base station 22 achieves cordless base station activation over the air without consuming time on a user's phone line or requiring additional equipment or hardware.

After task 66, the user may use handset 18 to engage in user communications in either the cellular or cordless modes of operation, as indicated at a task 68. If cordless base station 22 later requires any update programming, a task 70 will program cordless base station 22 using a similar two phase process to that discussed above in connection with tasks 64 and 66. After task 70, program flow loops back to task 68 to allow continued user communications.

Figure 5:
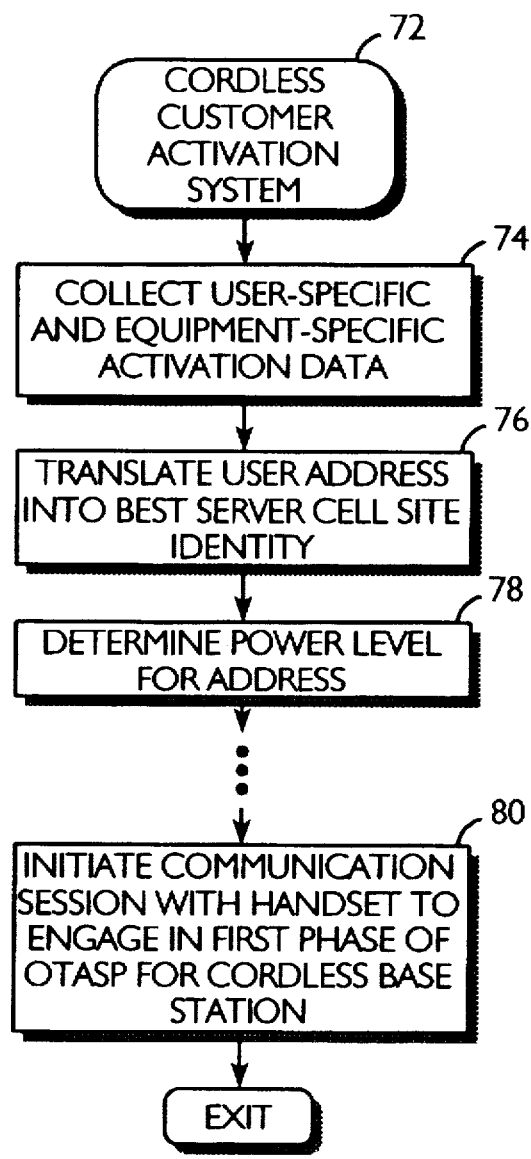
FIG. 5 shows a flow chart of a cordless customer activation system process performed by a cordless customer activation system.

FIG. 5 shows a flow chart of tasks performed by a cordless customer activation system process 72. Process 72 is performed, at least in part, through the operation of cordless customer activation system 30 (see FIG. 1). During a task 74, customer service representatives of cordless customer activation system 30 collect user-specific and equipment-specific activation data. User-specific data identifies the user and defines user preferences. User-specific data includes the address of the place where a cordless base station 22 is to be used. Equipment-specific data describes the equipment, such as a handset 18 and cordless base station 22 (see FIG. 1), which a user intends to use.

Next, in a task 76 the user's address is translated into a best server cell site identity. Task 76 may consult a computer geographical database to determine the latitude and longitude for the address. Then, cellular RF propagation pattern map data bases may be evaluated to determine which cell site antennas have radio coverage areas which cover or nearly cover the indicated latitude and longitude. In some cases, a cordless base station 22 may have more than one best server cell 14. This may occur when a cordless base station 22 is on the border between cells 14 or in areas where the cells 14 are relatively small.

A task 78 then determines the appropriate power level for operating cordless base station 22 and handset 18 in its cordless mode of operation, given the user's address. Cordless mode power levels are desirably lower in urban areas than in rural areas to reduce the likelihood of interference.

After task 78, ellipsis in FIG. 5 indicate that process 72 may include many other tasks conventionally performed by customer activation systems. Such other tasks are not specifically detailed herein to prevent such tasks from obfuscating the present invention.

Eventually program flow within process 72 proceeds to a task 80. During task 80 cordless customer activation system 30 (see FIG. 1) initiates a communication session with handset 18 to engage in the first phase of over the air service provisioning (OTASP) for cordless base station 22. Since cordless customer activation system 30 (see FIG. 1), rather than the user, controls the initiation of this communication session, customer activation system 30 can also control its own workload of cordless base station activations. If cordless customer activation system 30 (see FIG. 1) is overloaded with activations, activations can occur as time allows. After task 80, program flow exits process 72.

Figure 6:
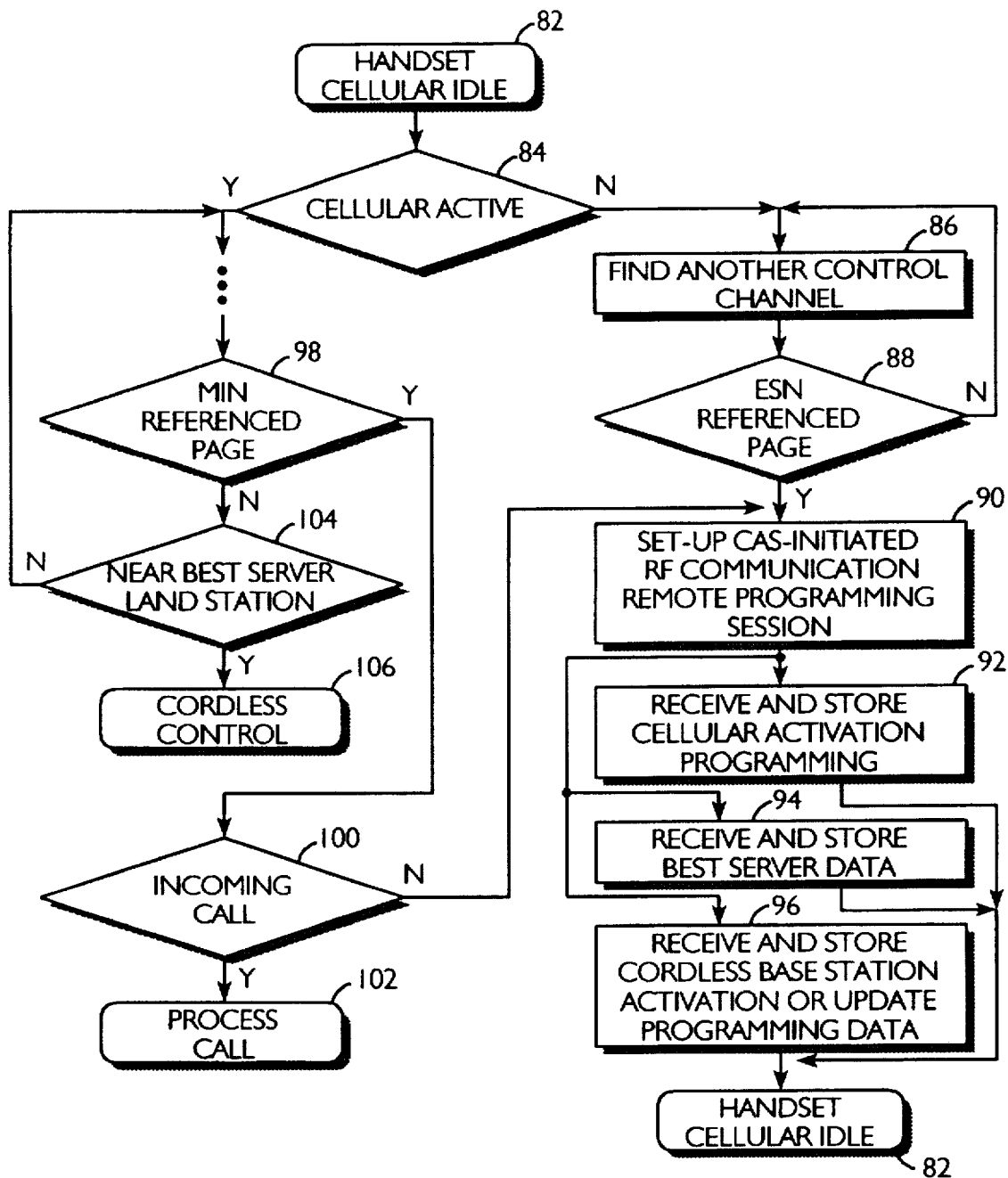
FIG. 6 shows a flow chart of a handset cellular idle process performed by a multi-mode handset.

FIG. 6 shows handset cellular idle process 82 performed by handset 18 in the preferred embodiments of the present invention. Generally, handset cellular idle process 82 is performed when handset 18 is in its cellular mode of operation. Process 82 begins with a query task 84, which determines whether handset 18 is activated for cellular use. If handset 18 has not been activated for cellular use, then it operates in an inactive state, and program control proceeds to a task 86. Task 86 finds a control channel which handset 18 may monitor to detect a page message transmitted, from a land station 20 (see FIG. 1) and addressed to the handset. In the preferred embodiment, the control channel may be one of dedicated channels 37 (see FIG. 2).

Next, a query task 88 determines if handset 18 has received an ESN referenced page directed to handset 18. Conventionally, cellular telephone equipment are paged using the cellular equipment's MIN. An ESN referenced page message is a message which conveys the ESN of a handset 18 rather than a MIN. An ESN referenced page is used to establish a communication session with an inactive handset 18 because an inactive handset 18 does not yet have a MIN. If an ESN referenced page has not been detected by handset 18, program control loops back through tasks 86 and 88 until an ESN referenced page is detected.

When an ESN referenced page directed to handset 18 is detected, the cellular customer activation system 32 (see FIG. 1) is attempting to activate handset 18 for cellular operation. At this point, handset 18 enters into a remote programming session that will lead to the activation of handset 18. In a task 90 handset 18 sets up the RF communication remote programming session with cellular customer activation system 32. This session is conducted through cellular land station 20 (see FIG. 1). During this session handset 18 receives and transmits data. Transmitted data may be acknowledgments of the received activation programming data and the like. The transmitted data are transmitted using relatively high power level signals. For example, the relatively high power level might be around 600 mw, which is a typical transmission power level for portable cellular handsets.

A remote programming session may convey one or more of several different types of programming data, as indicated by tasks 92, 94, and 96. During task 92, handset 18 receives and stores cellular activation programming from cellular customer activation system 32 (see FIG. 1). During task 94, handset 18 receives and stores data concerning its best server cell site 14 (see FIG. 1). During task 96, handset 18 receives and stores cordless base station activation or update programming data. One or more of tasks 92, 94, and 96 may occur in the same programming session.

Best server data referred to in task 94 may be treated differently from the cordless activation programming referred to in task 96. Handset 18 uses best server data before the cordless base station is activated. As discussed in more detail below, best server data is used by handset 18 to verify the user's address. Handset 18 will not attempt to perform the second phase of cordless base station activation, discussed above in connection with task 66 (see FIG. 4) until handset 18 is in the radio coverage area of its best server. Thus, if the user's address is incorrect, cordless base station activation may not be successful. An incorrect address may be corrected by having the user place a call to a customer representative who operates cordless customer activation system 30 (see FIG. 1).

Task 96 achieves the first phase of cordless base station activation included in the preferred embodiment of the present invention and referenced in FIG. 4. The data received in task 96 include authorization data which allow handset 18 to work in a cordless mode with cordless base station 22. So while task 92 allows handset 18 to work in a cellular mode, handset 18 is not authorized to work in a cordless mode until task 96 and a subsequent second phase of cordless base station activation have occurred.

If the remote programming session initiated in task 90 is successful, handset 18 is activated for cellular operation and will thereafter operate in a cellular-active state. After handset 18 has received the appropriate programming data in tasks 90 through 96 program flow returns to an appropriate entry point in handset cellular idle process 82, such as at query task 84.

When task 84 determines that handset 18 is operating in its cellular-active state, many routine cellular operations may be performed, as indicated by ellipsis in FIG. 6. These tasks include using handset 18 to make outgoing cellular calls, monitoring pilot channels broadcast from cellular land stations 20 (see FIG. 1), and selecting which cellular land stations 20 to listen to by monitoring their control channels 40 (channels 313–333 and 334–354 shown in FIG. 2). A query task 98 determines whether a MIN referenced page has been received at handset 18. A MIN referenced page is a page message transmitted by a land station 20 which is addressed to the handset's MIN. If handset 18 detects a MIN referenced page, a query task 100 determines if the page signals a standard incoming call to handset 18. If an incoming call is detected, handset 18 process the call in a conventional manner, as indicated at an operation 102. Operation 102 monitors normal call progress through to call tear down and then shifts program control back to handset cellular idle process 82. If query task 100 determines that the MIN referenced page directed at handset 18 is initiating a remote programming session, program control proceeds to task 90 (discussed above) to allow the remote programming session to progress. Accordingly, remote programming sessions may occur at any time whether or not handset 18 is cellular activated and whether or not the handset's cordless base station is activated.

Referring back to query task 98, if no MIN referenced page is detected by handset 18, program control proceeds to a query task 104. In task 104, handset 18 determines if the cellular land station 20 it is listening to at that time is the best server. In other words, handset 18 determines if it is in the radio coverage area of the best server cell site 14 (see FIG. 1). If the currently monitored cellular land station 20 (see FIG. 1) is not the best server, program control loops back to task 98 to continue monitoring for a MIN referenced page and to continue performing other conventional cellular idle operations. When handset 18 determines it is within radio coverage range of the best server cellular land station, program control proceeds to a cordless control process 106 discussed below.

Figure 7:
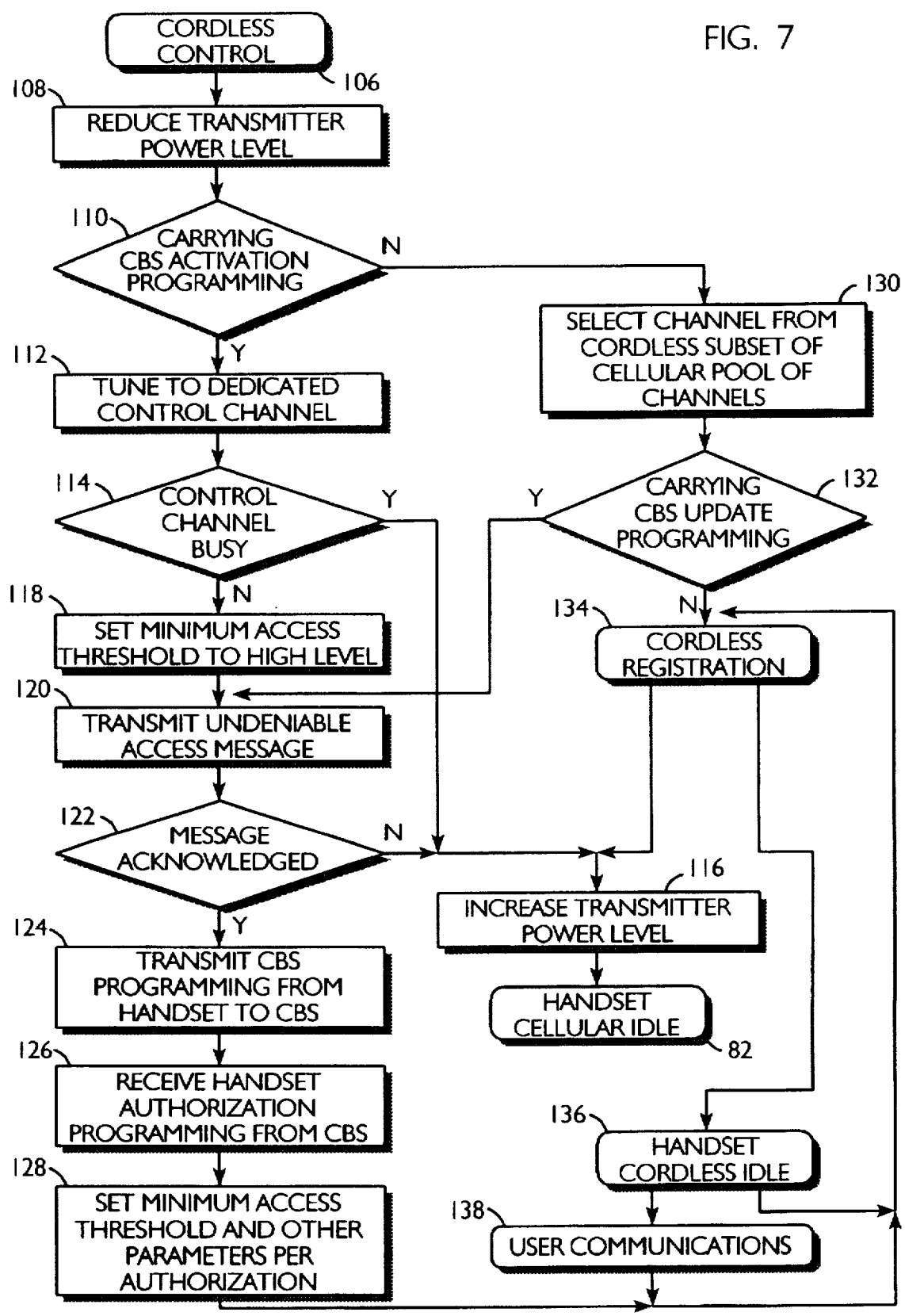
FIG. 7 shows a flow chart of a cordless control process performed by a multi-mode handset.

FIG. 7 shows a flow chart of cordless control process 106. Process 106 includes the second phase of cordless base station activation discussed above in connection with task 66 (see FIG. ). In a task 108, handset 18 sets a variable which reduces the power level at which transmitter 46 (see FIG. 3) of handset 18 will transmit future signals. In the cellular mode, handset 18 operates at around 600 mw (see FIG. 6). For the cordless mode of operation, which includes cordless base station activation, task 108 causes handset 18 to transmit at a much lower power level, for example at around 10 mw or less.

Next, a query task 110 determines whether handset 18 is carrying cordless base station activation programming. Handset 18 carries cordless base station activation programming if task 96 (see FIG. 6) has been performed in a manner consistent with first phase 64 (see FIG. 4), but second phase 66 (see FIG. 4) has not yet been performed. For the purposes of the present description, activation programming may be distinguished from update programming. Activation programming is used to activate an inactive cordless base station 22. Update programming is used to alter the programming of an active cordless base station 22. If query task 110 determines that handset 18 is carrying cordless base station activation programming, program control proceeds to a task 112.

Task 112 tunes handset 18 to one of the two dedicated control channels 37 (see FIG. 2). The selected control channel 37 is consistent with the A or B cellular system upon which handset 18 is operating. Cordless base station 22 is preprogrammed at the factory to look for a communication session on either of dedicated control channels 37 so it can receive activation data.

Next, a query task 114 determines if the dedicated control channel is busy. If busy, program control proceeds to task 116. Task 116 sets a variable that causes transmitter 46 (see FIG. 3) to transmit future signals at a power level which is increased relative to the cordless mode of operation power level. If task 114 determines the dedicated control channel 37 is not busy, an optional task 118 sets a minimum access signal strength threshold to a high level. When this threshold is high, handset 18 must be very close, for example within 2 to 5 feet, of cordless base station 22 for signals from cordless base station 22 to be recognized by handset 18.

After optional task 118, a task 120 causes handset 18 to transmit an "undeniable access" message over the channel to which transmitter 46 is tuned. A query task 122 then determines whether cordless base station 22 has acknowledged the undeniable access message. If the message has not been acknowledged, cordless base station 22 may never have heard the message because handset 18 was too far from cordless base station 22, cordless base station was not energized, or the like. In this situation, program control proceeds to task 116 to increase the power level of transmitter 46 (see FIG. 3), exit cordless control process 106, and reenter handset cellular idle process 82.

When the undeniable access message is acknowledged by cordless base station 22, the second phase of cordless base station activation (see FIG. 4) begins. In a task 124, handset 18 transmits the cordless base station (CBS) programming data previously received during the first phase of activation (see FIG. 6) to cordless base station 22 through an RF communication session. Next, in a task 126 cordless base station 22 returns at least a portion of the received activation programming to handset 18 as authorization data in an authorization process. For purposes of the present description, authorization refers to the process whereby a handset 18 becomes cordless activated to operate in a cordless mode of operation and engage in cordless communications with an activated cordless base station 22. Handset 18 may verify that this authorization data is the same data it sent to cordless base station 22 in task 124. Thus, task 126 authorizes and activates handset 18 to work with cordless base station 22. While the authorization process used above is one possibility for achieving authorization, those skilled in the art can devise alternate methods of authorizing handset 18.

After the authorization of task 126, a task 128 sets the minimum access threshold and other parameters of cordless base station 22 per the authorization processes. These data are now personalized for cordless base station 22. Although not shown, handset 18 desirably destroys the activation data, but not handset authorization data, in its memory 52 (see FIG. 3) after handset 18 becomes authorized. Destroying cordless base station activation programming positively prevents using handset 18 from engaging in subsequent activation processes until programmed to do so via cordless customer activation system 30 (see FIG. 1). If a problem arises with cordless base station activation, the problem may be resolved by having the user contact a customer service representative.

Returning to query task 110, if handset 18 is not carrying activation programming, its cordless base station 22 may already be activated. In this case, program control proceeds to a task 130 in which handset 18 selects a channel from cordless subset 38 (see FIG. 2) of pool of channels 34 on which to make a transmission to cordless base station 22. A query task 132 determines if handset 18 is carrying cordless base station update programming. If so, program control proceeds to task 120 where handset 18 sends an undeniable access message to cordless base station 22 and engages in a communication session to transmit this update programming to cordless base station 22. The update programming is transferred to cordless base station 22 in much the same manner as discussed above for activation programming.

If query task 132 determines that handset 18 is carrying neither activation nor update programming, handset 18 and cordless base station 22 may be activated and handset 18 may enter its cordless mode of operation. In order to determine whether handset may enter or remain in its cordless mode of operation, handset 18 performs a cordless registration process 134. Process 134 is entered when task 134 determines that handset 18 is carrying neither activation nor update programming and when task 128 has finished.

During process 134, handset 18 broadcasts a "Here I Am" registration message and listens to see if cordless base station 22 responds with an acknowledgment. If cordless base station 22 responds to the message, program control goes to a handset cordless idle process 136. While in handset cordless idle process 136, handset 18 may engage in cordless user communications through cordless base station 22, as indicated in a task 138. If after process 134, cordless base station 22 does not respond to the message being transmitted by handset 18, program control returns to task 116, and handset cellular idle process 82.

Figure 8:
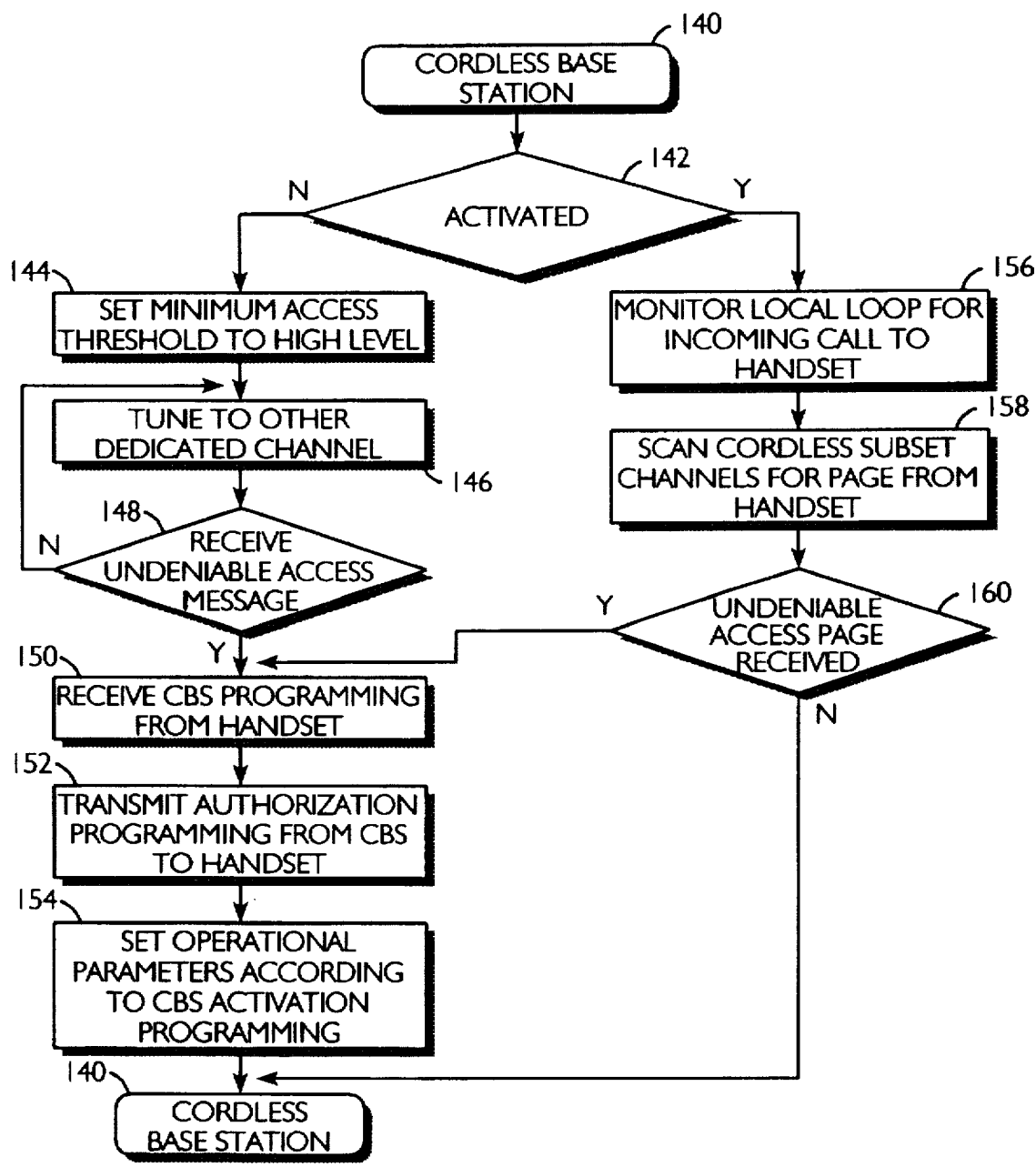
FIG. 8 shows a flow chart of a cordless base station process performed by a cordless base station.

FIG. 8 describes a cordless base station process 140 which complements the cordless control process 106 discussed in FIG. 7. Process 140 begins with a query task 142 to determine whether cordless base station 22 is activated. If cordless base station 22 is not activated, an optional task 144 sets the minimum access signal strength threshold to a high level. Setting this threshold to a high level forces handset 18 to be in close proximity to cordless base station 22 before a communication session between the two may take place.

Cordless base station 22 doesn't know what the cordless subset of channels 38 is at this point. Accordingly, a task 146 tunes the cordless base station 22 transmitter and receiver to one of the dedicated control channels 37. After the tuning operation, a query task 148 monitors transmissions on the selected channel to detect an undeniable access message directed specifically at cordless base station 22. In the preferred embodiment, this undeniable access message will include the serial number of the cordless base station 22. All other undeniable access messages and other signals will be ignored by cordless base station 22. In the preferred embodiment, the serial number of cordless base station 22 was programmed at the factory into at least one of the handsets 18 packaged and sold with that specific cordless base station 22. However, having the serial number programmed into handset 18 is not necessary for purposes of the present invention.

When task 148 eventually receives the desired undeniable access message that is addressed specifically to it, a task 150 then receives activation or update programming from handset 18. This programming is stored at appropriate locations in the cordless base station memory. Next, in a task 152, cordless base station 22 enters an authorization mode and transmits at least a part of this programming back to handset 18. Task 152 complements task 126 from FIG. 7.

In a task 154, cordless base station 22 sets its operational parameters according to the cordless base station activation programming received in task 150. These operational parameters may include a minimum access signal strength threshold, the MIN of handsets 18 authorized to operate on this cordless base station 22, subsets of pool of channels 34 (see FIG. 2) on which cordless base station 22 may operate, and power levels at which cordless base station 22 may operate. After these parameters are set, program flow goes to a suitable entry point back into cordless base station process 140.

Referring back to task 142, if cordless base station 22 is already activated then a task 156 monitors the local loop, or connection to PSTN 28 (see FIG. 1). When cordless base station 22 detects an incoming call, cordless base station 22 will take steps well known in the art to transfer a page message to handset 18. Next, in a task 158, cordless base station 22 scans at least a portion of cordless subset of channels 38 (see FIG. 2) to determine if one of its handsets 18 is trying to contact it. If cordless base station 22 detects a transmission directed toward it, a query task 160 determines if an undeniable access page has been received by cordless base station 22. If the undeniable access page was detected in task 160, program control proceeds back to task 150 to reenter the programming phase of cordless base station activation. If task 160 does not detect the receipt of an undeniable access page, program control returns to a suitable entry point into cordless base station process 140. When task 160 detects a page indicating handset 18 is requesting an outgoing call, that request is processed in a conventional manner by cordless base station 22.

In summary, the present invention provides an improved multi-mode communication network with handset-assisted cordless base station activation. A multi-mode handset is activated for cellular use by a cellular customer activation system. In the first phase of a two phase cordless base station activation process, programming data are transferred from a cordless customer activation system to the handset. In the second phase, the programming data are transferred from the handset to the cordless base station. Neither cordless base stations nor handsets require extra equipment or hardware to accomplish the cordless base station activation and handset authorization functions. Since the process is carried out using RF communications, the user's phone line is not tied up transferring data, and the user's phone line is available so that a user may call a customer service representative if necessary. The process is customer activation system controlled, which avoids extra confusion for the user and unplanned overloads of cordless base station activations at the customer activation system.

The present invention has been described above with reference to preferred embodiments. However, those skilled in the art will recognize that changes and modifications may be made in these preferred embodiments without departing from the scope of the present invention. For example, alternate embodiments may use different techniques for authorizing data transferred from the handset to the cordless base station. In addition, those skilled in the art will appreciate that the precise task and process organization discussed herein may be substantially altered while achieving equivalent results. These and other changes and modifications which are obvious to those skilled in the art are intended to be included within the scope of the present invention.

What is claimed is:

1. In a multi-mode communication network in which cellular and cordless communications are delivered through a multi-mode handset, a method for programming a cordless base station comprising the steps of:
    programming said handset with data which identify a cellular land station;
    first transferring cordless base station programming data from a customer activation system to said handset; and
    second transferring said cordless base station programming data from said handset to said cordless base station while said handset is within radio coverage area of said identified cellular land station.

2. A method as claimed in claim 1 additionally comprising the step of verifying that said handset is within said radio coverage area of said cellular land station prior to performing said second transferring step.

3. A method as claimed in claim 1 wherein said second transferring step comprises the step of establishing an RF communication session between said handset and said cordless base station, said RF communication session being initiated by said handset.

4. In a multi-mode communication network in which cellular and cordless communications are delivered through a multi-mode handset, a method for programming a cordless base station comprising the steps of:
    first transferring cordless base station programming data from a customer activation system to said handset by establishing a first RF communication session between said customer activation system and said handset, said first RF communication session being initiated by said customer activation system; and
    second transferring said cordless base station programming data from said handset to said cordless base station by establishing a second RF communication session between said handset and said cordless base station, said second RF communication session being initiated by said handset.

5. A method as claimed in claim 4 additionally comprising the step of activating said handset to engage in cellular operations, said activating step being completed prior to said first transferring step.

6. In a multi-mode communication network in which cellular and cordless communications are delivered through a multi-mode handset and in which channels selected from a common pool of channels are used for delivering said cellular and said cordless communications, a method for programming a cordless base station comprising the steps of:
    configuring said cordless base station programming data to define a cordless subset of said pool of channels;
    first transferring cordless base station programming data from a customer activation system to said handset;
    tuning said handset and said cordless base station to a predetermined channel not included in said cordless subset of said pool of channels;
    second transferring said cordless base station programming data from said handset to said cordless base station by establishing an RF communication session between said handset and said cordless base station, said RF communication session being initiated by said handset; and
    engaging, after said second transferring step, in user communications between said handset and said cordless base station using channels selected from said cordless subset of said pool of channels.

7. A method as claimed in claim 6 additionally comprising the step of verifying, after said tuning step and before said second transferring step, that said predetermined channel is not in use.

8. A method as claimed in claim 1 wherein:
    said first transferring step comprises the step of transmitting radio frequency energy from said handset at a first power level; and
    said second transferring step comprises the step of transmitting radio frequency energy from said handset at a second power level, said second power level being less than said first power level.

9. In a multi-mode communication network in which cellular and cordless communications are delivered through a multi-mode handset, a method for programming a cordless base station comprising the steps of: configuring cordless base station programming data to define an activated minimum access signal strength threshold;

first transferring said cordless base station programming data from a customer activation system to said handset by transmitting radio frequency energy from said handset at a first power level;

second transferring said cordless base station programming data from said handset to said cordless base station by transmitting radio frequency energy from said handset at a second power level, said second power level being less than said first power level, said second transferring step being engaged in when handset signal strength measured at said cordless base station is greater than a programming minimum access signal strength threshold, said programming minimum access signal strength threshold being greater than said activated minimum access signal strength threshold; and engaging, after said second transferring step, in user communications between said handset and said cordless base station when handset signal strength measured at said cordless base station is greater than said activated minimum access signal strength threshold.

10. In a multi-mode communication network in which cellular and cordless communications are delivered through a first handset, a method for programming a cordless base station comprising the steps of:

configuring said cordless base station programming data to identify said first handset along with a second handset which can engage in user communications through said cordless base station;

transferring said cordless base station programming data from a customer activation system to said first handset;

transferring said cordless base station programming data from said customer activation system to said second handset; and transferring said cordless base station programming data from one of said first and second handsets to said cordless base station.

11. A method as claimed in claim 1 wherein said programming data transferred in said second transferring step activates said cordless base station for providing cordless communications to said handset, and said method additionally comprises the steps of:

third transferring cordless base station updated programming data from a customer activation system to said handset, said third transferring step occurring after said cordless base station has been activated; and fourth transferring said cordless base station updated programming data from said handset to said cordless base station.

12. In a multi-mode communication network in which cellular and cordless communications are delivered through a multi-mode handset, a method for activating a cordless base station comprising the steps of:

a) programming said handset with data which identify a cellular land station;

b) transferring cordless base station activation programming from a customer activation system to said handset;

c) establishing an RF communication session between said handset and said cordless base station, said RF communication session being initiated by said handset while said handset is within a radio coverage area of said identified cellular land station; and d) transferring said cordless base station activation programming from said handset to said cordless base station during said RF communication session.

13. A method as claimed in claim 12 wherein:

said RF communication session established between said handset and said cordless base station is a second RF communication session; and said transferring step b) comprises the step of establishing a first RF communication session between said customer activation system and said handset, said first RF communication session being initiated by said customer activation system.

14. A method as claimed in claim 13 additionally comprising the step of activating said handset to engage in cellular operations, said activating step being completed prior to said steps a), b), c) and d).

15. A method as claimed in claim 12 wherein:

said transferring step b) comprises the step of transmitting radio frequency energy from said handset at a first power level; and said establishing step c) comprises the step of transmitting radio frequency energy from said handset at a second power level, said second power level being less than said first power level.

16. A method as claimed in claim 12 wherein said transferring steps b) and d) involve a first handset which can engage in user communications through said cordless base station following said transferring step d), and said method additionally comprises the steps of:

configuring said cordless base station programming data to identify said first handset along with a second handset which can engage in user communications through said cordless base station; and transferring said cordless base station programming data from said customer activation system to said second handset.

17. A multi-mode portable radiotelephone which communicates in a cellular mode with a cellular land station and in a cordless mode with a cordless base station after said cordless base station has been activated, said portable radiotelephone comprising:

a controller;

a memory coupled to said controller;

a transmitter coupled to said controller; and a receiver coupled to said controller; wherein, said controller and memory are configured to obtain and save data which identify a cellular land station, to control said receiver to receive cordless base station activation programming from a customer activation system, to store said cordless base station activation programming in said memory, and to control said transmitter to transmit said cordless base station activation programming to said cordless base station while said portable radiotelephone is within a radio coverage area of said identified cellular land station.

18. A portable radiotelephone as claimed in claim 17 wherein:

said controller and memory are configured to control said transmitter to operate at a first power level in connection with receiving said cordless base station activation programming from said customer activation system; and said controller and memory are configured to control said transmitter to operate at a second power level in connection with transmitting said cordless base station activation programming to said cordless base station, said second power level being less than said first power level.

* * * * *

UNITED STATES PATENT AND TRADEMARK OFFICE
CERTIFICATE OF CORRECTION

PATENT NO : 5,794,141
DATED : 8/11/98
INVENTOR(S): Robert G. Zicker

It is certified that error appears in the above-identified patent and that said Letters Patent are hereby corrected as shown below:

GTE MOBILE COMMUNICATIONS SERVICE CORPORATION
Atlanta, Georgia

Signed and Sealed this

Eighth Day of February, 2000

*Attest:*

Q. TODD DICKINSON

*Attesting Officer*  *Commissioner of Patents and Trademarks*